United States Patent
Oshiro (10) Patent No.: US 11,178,300 B2
(45) Date of Patent: Nov. 16, 2021

(54) POST-PROCESSING APPARATUS THAT DETECTS AN OBJECT

(71) Applicant: TOSHIBA TEC KABUSHIKI KAISHA, Tokyo (JP)

(72) Inventor: Toshiaki Oshiro, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 16/507,070

(22) Filed: Jul. 10, 2019

(65) Prior Publication Data
US 2020/0186659 A1 Jun. 11, 2020

(30) Foreign Application Priority Data
Dec. 6, 2018 (JP) .............................. JP2018-229376

(51) Int. Cl.
*H04N 1/00* (2006.01)
*G03G 15/00* (2006.01)

(52) U.S. Cl.
CPC ..... *H04N 1/00567* (2013.01); *G03G 15/6541* (2013.01); *G03G 2215/00126* (2013.01); *G03G 2215/00827* (2013.01)

(58) Field of Classification Search
CPC ....... G03G 15/6538–655; G03G 15/70; G03G 2215/00126; G03G 2215/00827; B65H 29/34; B65H 2511/521; H04N 1/00567
See application file for complete search history.

(56) References Cited

U.S. PATENT DOCUMENTS

| 5,478,061 A | * | 12/1995 | Murakami | G03G 15/6538 |
| | | | | 270/58.08 |
| 7,883,081 B2 | * | 2/2011 | Iguchi | B65H 31/02 |
| | | | | 270/58.17 |
| 8,226,079 B2 | * | 7/2012 | Ozawa | B65H 31/34 |
| | | | | 270/58.09 |
| 9,760,051 B2 | * | 9/2017 | Hashimoto | B65H 43/02 |
| 2010/0007074 A1 | | 1/2010 | Iguchi et al. | |
| 2017/0212462 A1 | | 7/2017 | Hashimoto | |

FOREIGN PATENT DOCUMENTS

| JP | 08-157132 | | 6/1996 |
| JP | 2004043037 A | * | 2/2004 |
| JP | 2014-169160 | | 9/2014 |
| JP | 2014-201434 | | 10/2014 |

OTHER PUBLICATIONS

Extended European Search Report for European Patent Application No. 19191700.4 dated Feb. 10, 2020.

\* cited by examiner

*Primary Examiner* — Justin N Olamit
(74) *Attorney, Agent, or Firm* — Amin, Turocy & Watson LLP (57) ABSTRACT

A post-processing apparatus according to an embodiment includes a processing tray, a post-processing section, a sensor, and a control section. A sheet supplied from an image forming apparatus is led into the processing tray through a lead-in path. The post-processing section applies post-processing to the sheet sent from the processing tray. The sensor detects an object passing a detection space in the lead-in path. The control section controls operation of the post-processing section based on a time in which the sensor detects the object.

20 Claims, 5 Drawing Sheets

POST-PROCESSING APPARATUS THAT DETECTS AN OBJECT

CROSS-REFERENCE TO RELATED APPLICATION

This application is based upon and claims the benefit of priority from Japanese Patent Application No. 2018-229376, filed Dec. 6, 2018, the entire contents of which are incorporated herein by reference.

FIELD

Embodiments described herein relate generally to a post-processing apparatus.

BACKGROUND

A post-processing apparatus performs post-processing such as stapling on sheets (paper) discharged from an image forming apparatus. For example, the post-processing apparatus includes a processing tray and a stapling section. The post-processing apparatus leads a sheet supplied from the image forming apparatus into the stapling section from the processing tray. The stapling section staples a sheet bundle.

The post-processing apparatus includes a guide in front of the stapling section. Clearance between the processing tray and the guide is smaller than the thickness (the diameter) of a finger of a user. The guide improves safety of the post-processing apparatus by preventing the finger of the user from entering the stapling section.

If the clearance between the processing tray and the guide is small enough for disabling insertion of a slender finger of a child, the safety can be further improved. However, if the clearance is small, it is likely that the number of sheets stacked on the processing tray decreases and a maximum number of sheets to be stapled is insufficient. Therefore, it is demanded to sufficiently secure the number of post-processable sheets and improve safety.

DETAILED DESCRIPTION

An object of embodiments is to provide a post-processing apparatus that can sufficiently secure the number of post-processable sheets and is excellent in safety.

A post-processing apparatus according to an embodiment includes a processing tray, a post-processing section, a sensor, and a control section. A sheet supplied from an image forming apparatus is led into the processing tray through a lead-in path. The post-processing section applies post-processing to the sheet sent from the processing tray. The sensor detects an object passing a detection space in the lead-in path. The control section controls operation of the post-processing section based on a time in which the sensor detects the object.

A post-processing apparatus according to an embodiment is explained below with reference to the drawings.

A post-processing apparatus 3 in an image forming system 1 according to an embodiment is explained with reference to FIGS. 1 to 7.

Figure 1:
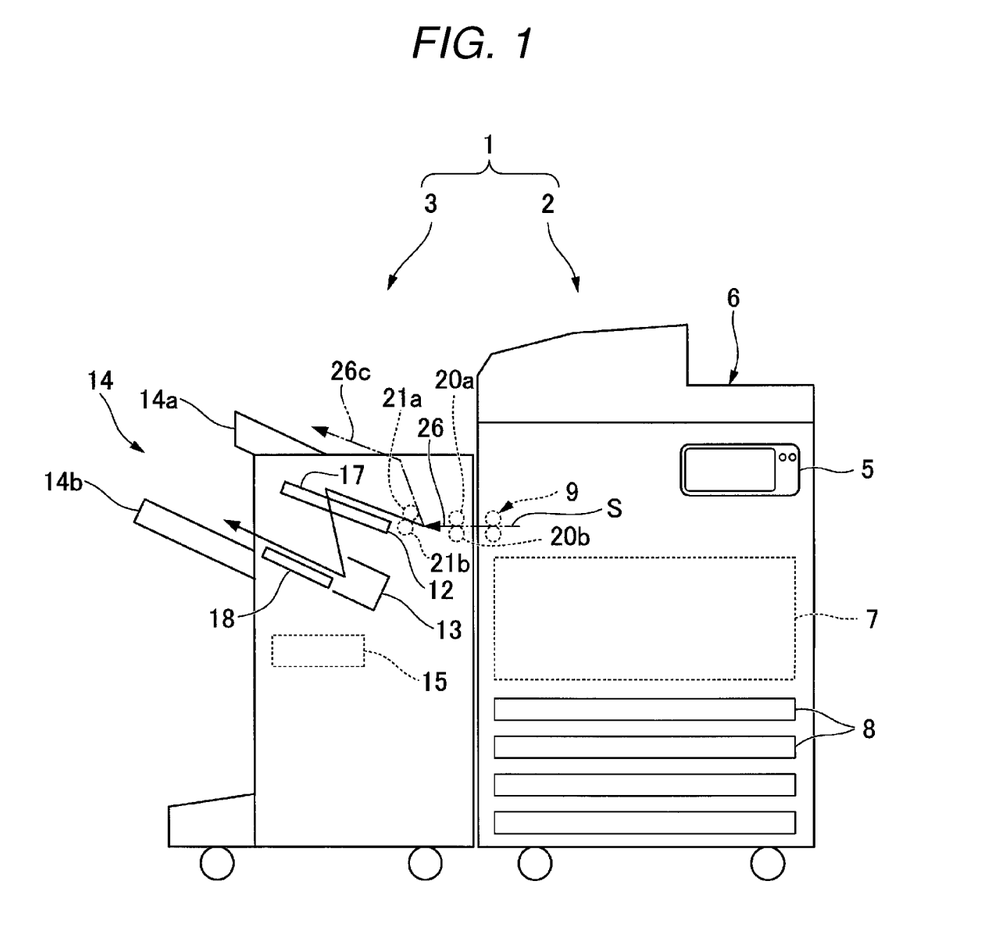
FIG. 1 is a schematic configuration diagram of an image forming system according to an embodiment.

As illustrated in FIG. 1, the image forming system 1 includes an image forming apparatus 2 and the post-processing apparatus 3. For example, the image forming apparatus 2 is a multi function peripheral (hereinafter referred to as "MFP"). The image forming apparatus 2 forms an image on a sheet-like recording medium (hereinafter referred to as "sheet S") such as paper. The post-processing apparatus 3 performs post-processing on the sheet S conveyed from the image forming apparatus 2. A stacked plurality of sheets S are referred to as sheet bundle SS (see FIG. 7).

The image forming apparatus 2 includes a control panel (an operation section) 5, a scanner section 6, a printer section 7, a paper feeding section 8, and a paper discharging section 9. The control panel 5 includes various keys, a touch panel, or the like that receives operation of a user. The control panel 5 receives an input concerning a type of post-processing for the sheet S. For example, with the control panel 5, it is possible to select a sort mode in which sorting is performed, a staple mode in which stapling is performed, or a non-sort mode in which the sorting and the stapling are not performed.

If the non-sort mode is selected, the control panel 5 receives selection concerning whether the sheet S is discharged to a fixed tray 14a of the post-processing apparatus 3 or the sheet S is discharged to a movable tray 14b of the post-processing apparatus 3. The image forming apparatus 2 sends, to the post-processing apparatus 3, information concerning a type of post-processing input from the control panel 5.

The scanner section 6 includes a reading section that reads image information of a copying target object. The scanner section 6 sends the read image information to the printer section 7. The printer section 7 forms an output image with a developer such as toner based on the image information transmitted from the scanner section 6 or an external apparatus. The printer section 7 applies heat and pressure to a toner image transferred onto the sheet S and fixes the toner image on the sheet S.

The paper feeding section 8 supplies the sheets S to the printer section 7 one by one according to timing when the printer section 7 forms a toner image. The paper discharging section 9 conveys the sheet S discharged from the printer section 7 to the post-processing apparatus 3.

The post-processing apparatus 3 is explained.

The post-processing apparatus 3 is disposed adjacent to the image forming apparatus 2. The post-processing apparatus 3 executes, on the sheet S conveyed from the image forming apparatus 2, post-processing designated through the control panel 5. For example, the post-processing is stapling, punching, folding, and bookbinding. In this embodiment, the stapling is adopted as the post-processing. Therefore, the post-processing apparatus 3 is a stapling apparatus.

The post-processing apparatus 3 includes a standby section 12, a processing section 13, a discharging section 14, and a post-processing control section 15. The standby section 12 temporarily holds up (buffers) the sheet S conveyed from the image forming apparatus 2. The standby section 12 includes a standby tray 17. For example, the standby section 12 puts a following plurality of sheets S on standby while post-processing of preceding sheets S is performed in the processing section 13. The standby section 12 is provided above the processing section 13. For example, the standby section 12 superimposes a preset plurality of sheets S and puts the plurality of sheets S on standby. If the processing section 13 is emptied, the standby section 12 drops the held-up sheets S toward the processing section 13.

The processing section 13 performs post-processing on the sheets S conveyed to the processing section 13. The processing section 13 includes a processing tray 18. The processing section 13 performs stapling, which is binding by a stapler, on the sheet bundle SS (see FIG. 7) of the number of sheets to be stapled obtained by aligning a plurality of sheets S. The processing section 13 discharges the sheets S subjected to the post-processing to the discharging section 14.

Figure 2:
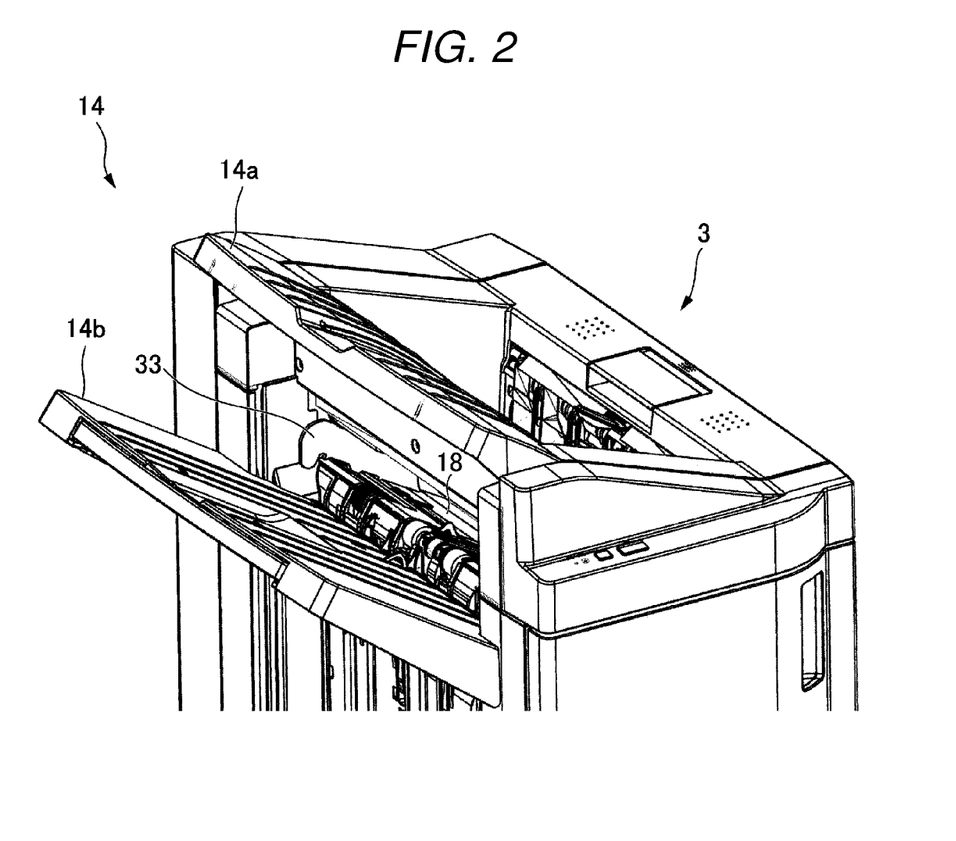
FIG. 2 is a perspective view of a main part of a post-processing apparatus according to the embodiment.
Figure 3:
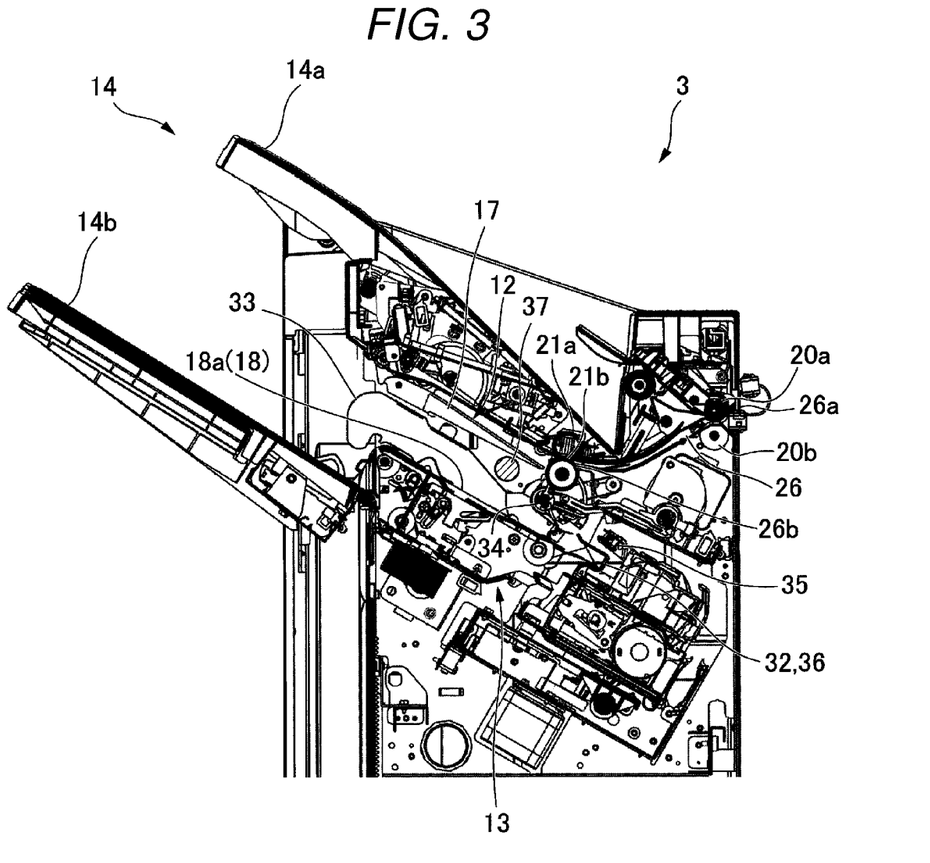
FIG. 3 is a side sectional view illustrating a main part configuration of the post-processing apparatus.

As illustrated in FIGS. 1 to 3, the fixed tray 14a of the discharging section 14 is provided in an upper part of the post-processing apparatus 3. The movable tray 14b is provided in a side part of the post-processing apparatus 3. The movable tray 14b is movable in the up-down direction along the side part of the post-processing apparatus 3. The sheet S is discharged to the fixed tray 14a and the movable tray 14b.

The post-processing control section 15 (see FIG. 1) controls the operation of the entire post-processing apparatus 3. That is, the post-processing control section 15 controls the standby section 12, the processing section 13, and the discharging section 14. The post-processing control section 15 controls the operation of inlet rollers 20a and 20b and outlet rollers 21a and 21b. The post-processing control section 15 is formed by a control circuit including a CPU, a ROM, and a RAM.

The configurations of the sections of the post-processing apparatus 3 are explained in detail with reference to FIG. 3.

In this embodiment, an "upstream side" and a "downstream side" respectively mean an upstream side (the image forming apparatus 2 side) and a downstream side (the fixed tray 14a side or the movable tray 14b side) in a conveying direction of the sheet S. A "front end portion" and a "rear end portion" respectively mean a "downstream side end portion" and an "upstream side end portion" in the sheet conveying direction. A direction substantially parallel to the plane of the sheet S (a sheet surface direction) and substantially orthogonal to the sheet conveying direction is referred to as sheet width direction W (see FIG. 4). A view from a direction parallel to the sheet width direction W is referred to as side view.

As illustrated in FIGS. 1 and 3, the post-processing apparatus 3 includes a conveyance path 26 for conveying the sheet S led in from the paper discharging section 9 of the image forming apparatus 2. A pair of inlet rollers 20a and 20b and a pair of outlet rollers 21a and 21b are provided in the conveyance path 26. The conveyance path 26 is provided on the inside of the post-processing apparatus 3.

As illustrated in FIG. 3, the conveyance path 26 includes a sheet supply port 26a and a sheet discharge port 26b. The sheet supply port 26a faces the paper discharging section 9 (see FIG. 1) of the image forming apparatus 2. The sheet S is supplied to the sheet supply port 26a from the image forming apparatus 2. The sheet discharge port 26b faces the standby section 12. The sheet S passed through the conveyance path 26 is conveyed to the standby section 12 from the sheet discharge port 26b.

The post-processing apparatus 3 includes a second conveyance path 26c (see FIG. 1) extending toward the fixed tray 14a of the discharging section 14. The second conveyance path 26c is formed to branch from the conveyance path 26. The second conveyance path 26c guides the sheet S toward the fixed tray 14a in the non-sort mode. The conveyance path 26 guides the sheet S to the standby section 12 if the sort mode or the staple mode is selected.

The inlet rollers 20a and 20b are provided in the vicinity of the sheet supply port 26a. The inlet rollers 20a and 20b are disposed in parallel to each other. The inlet roller 20a is a driving roller disposed on the upper surface side of the conveyance path 26. The inlet roller 20b is a driven roller disposed on the lower surface side of the conveyance path 26. The inlet rollers 20a and 20b hold the sheet S in a nip. The inlet rollers 20a and 20b convey the held sheet S to the conveying direction downstream side.

The outlet rollers 21a and 21b are provided in the vicinity of the sheet discharge port 26b. The outlet rollers 21a and 21b are disposed in parallel to each other. The outlet roller 21a is a driven roller disposed on the upper surface side of the conveyance path 26. The outlet roller 21b is a driving roller disposed on the lower surface side of the conveyance path 26. The outlet rollers 21a and 21b hold the sheet S in a nip. The outlet rollers 21a and 21b convey the held sheet S to the conveying direction downstream side.

The standby section 12 is explained.

The standby section 12 includes the standby tray (a buffer tray) 17. The rear end portion of the standby tray 17 is located in the vicinity of the outlet rollers 21a and 21b. The rear end portion of the standby tray 17 is located below the sheet discharge port 26b of the conveyance path 26. The standby tray 17 is inclined with respect to the horizontal direction to be gradually higher toward the downstream side in the sheet conveying direction. The standby tray 17 superimposes a plurality of sheets S and puts the plurality of sheets S on standby while the post-processing is performed in the processing section 13.

Figure 4:
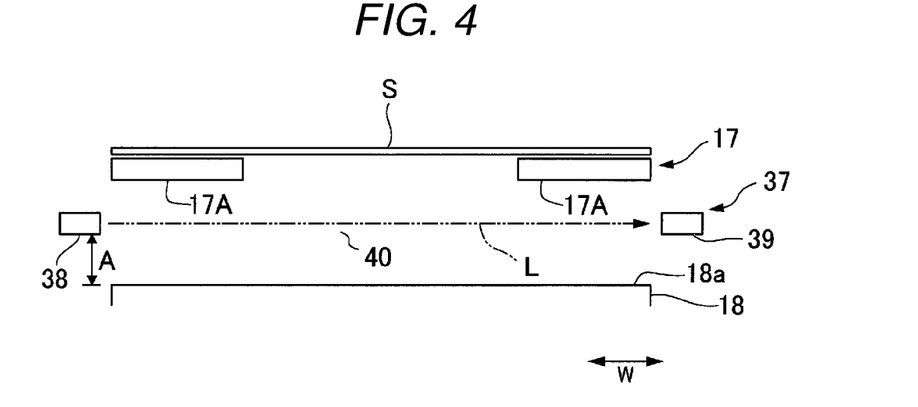
FIG. 4 is a schematic diagram illustrating a standby tray and a processing tray of the post-processing apparatus.

As illustrated in FIG. 4, the standby tray 17 includes a pair of tray members 17A and 17A capable of approaching and separating from each other in the sheet width direction W. The pair of tray members 17A and 17A approaches each other and supports the sheet S if the sheet S is put on standby in the standby tray 17.

Figure 5:
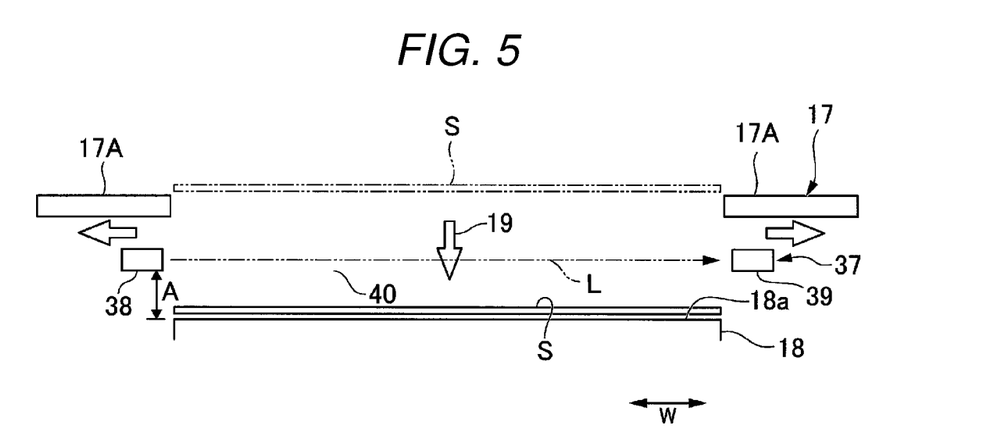
FIG. 5 is a schematic diagram illustrating the operation of the standby tray.

As illustrated in FIG. 5, the pair of tray members 17A and 17A separates from each other if the sheet S is moved from the standby tray 17 toward the processing tray 18. Since the distance between the tray members 17A and 17A is larger than the width of the sheet S, the supported sheet S drops toward the processing tray 18. A path through which the sheet S is moved from the standby tray 17 to the processing tray 18 is a lead-in path 19 through which the sheet S is led into the processing tray 18.

The processing section 13 is explained.

As illustrated in FIG. 3, the processing section 13 includes the processing tray 18, lateral alignment plates 33, a rear end stopper 32, a guide 34, a stapler (a binding section, a post-processing section) 35, an ejector 36, and a sensor 37. The stapler is referred to as stapling section as well.

The processing tray 18 is provided in a position lower than the standby tray 17. The processing tray 18 is inclined with respect to the horizontal direction to be gradually higher toward the downstream side in the sheet conveying direction. For example, the processing tray 18 is substantially parallel to the standby tray 17. The processing tray 18 includes a conveyance surface 18a that supports the sheet S (i.e., on which the sheet S is placed).

A pair of lateral alignment plates 33 is provided to be opposed to both sides in the sheet width direction W (see FIG. 4) of the conveyance surface 18a of the processing tray 18. The pair of lateral alignment plates 33 is provided to be separated from each other in the sheet width direction W. The lateral alignment plates 33 are movable in a direction in which the lateral alignment plates 33 approach each other and a direction in which the lateral alignment plates 33 separate from each other in the sheet width direction W. The lateral alignment plates 33 configure a lateral alignment device that performs alignment (so-called lateral alignment) of the sheet S in the sheet width direction W.

The rear end stopper 32 is provided at the end portion on the upstream side of the processing tray 18. The end on the upstream side of the sheet S placed on the processing tray 18 is brought into contact with the rear end stopper 32, whereby the rear end stopper 32 vertically aligns the sheet S.

Figure 6:
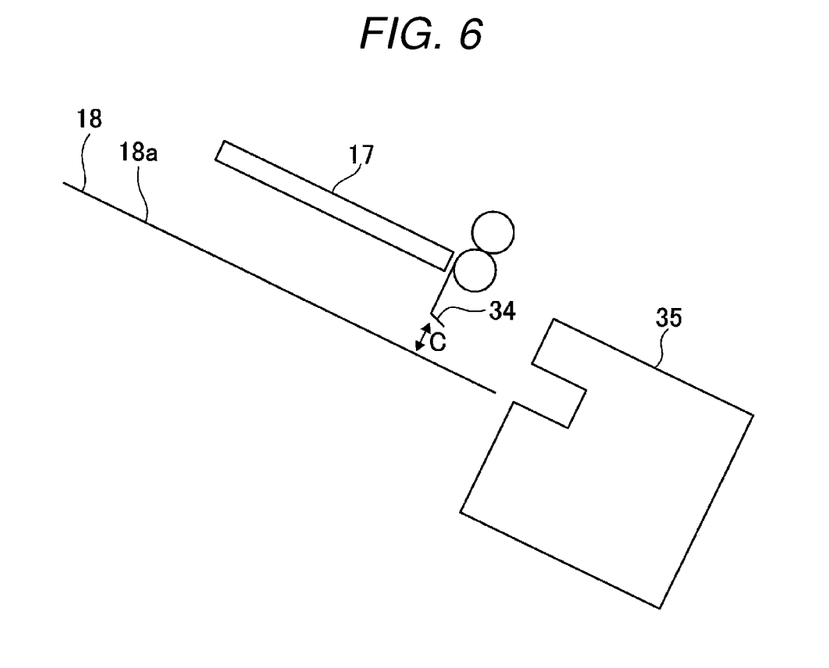
FIG. 6 is a side sectional view schematically illustrating a main part configuration of the post-processing apparatus.

As illustrated in FIGS. 3 and 6, the guide 34 is provided to face the processing tray 18. As illustrated in FIG. 6, clearance C between the conveyance surface 18a of the processing tray 18 and the guide 34 is desirably set smaller than the thickness (the diameter) of a finger of the user. Consequently, the finger of the user less easily enters the stapler 35 from the processing tray 18. Therefore, it is possible to improve safety.

If the clearance C is decided based in the thickness (the diameter) of a finger of an adult, a slender finger of a child is likely to pass through the gap between the conveyance surface 18a and the guide 34. However, in the post-processing apparatus 3, as explained below, the stapler 35 stops if the finger of the user passes through the gap between the conveyance surface 18a and the guide 34 and reaches a detection space 40 (see FIGS. 4 and 5). Therefore, it is possible to secure safety.

As illustrated in FIG. 3, the stapler 35 is disposed behind the processing tray 18. The stapler 35 is capable of clinching the end portion of the sheet S coming into contact with the rear end stopper 32 and aligned. If the staple mode is selected, the stapler 35 performs stapling on the end portion of the sheet bundle SS (see FIG. 7) coming into contact with the rear end stopper 32 and aligned.

The ejector 36 is capable of moving the sheet S toward the conveying direction downstream side. The ejector 36 advances the sheet bundle SS subjected to the stapling.

As illustrated in FIG. 4, for example, the sensor 37 is a transmission-type sensor including a light emitting section 38 and a light receiving section 39. For example, the light emitting section 38 includes a light emitting element such as a photodiode. The light receiving section 39 receives detection light L emitted by the light emitting section 38. For example, the light receiving section 39 includes a light receiving element such as a phototransistor. The light emitting section 38 and the light receiving section 39 are disposed to be opposed to each other at an interval in the sheet width direction W. If the intensity of the detected detection light L is smaller than a threshold, the light receiving section 39 detects an object present in the detection space 40 and outputs a detection signal to the post-processing control section 15. The detection space 40 is a space between the light emitting section 38 and the light receiving section 39. At least a part of the detection space 40 is included in the lead-in path 19 (see FIG. 5).

Figure 7:
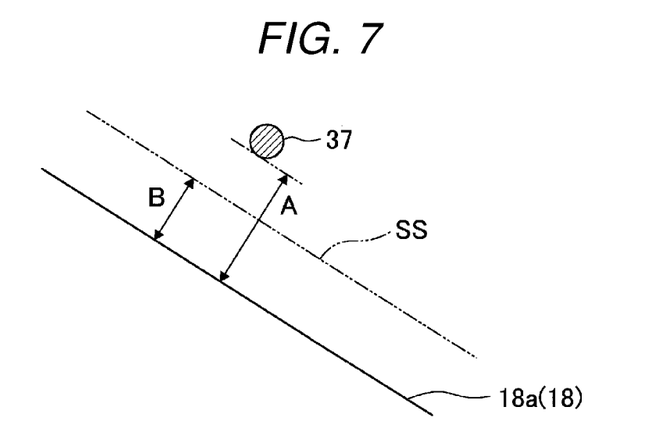
FIG. 7 is a schematic diagram illustrating a relation between a sensor and the processing tray of the post-processing apparatus.

As illustrated in FIGS. 3 and 7, the sensor 37 is located in a position lower than the standby tray 17 and higher than the processing tray 18 when viewed from the direction parallel to the sheet width direction W. As illustrated in FIG. 7, a distance A (see FIGS. 4 and 5) of the sensor 37 from the conveyance surface 18a of the processing tray 18 is larger than thickness B of the sheet bundle SS of a maximum number of sheets to be stapled. Therefore, after the sheets S are mounted on the processing tray 18, even if the number of sheets S reaches the maximum number of sheets to be stapled, the sheet bundle SS does not block the detection light L (see FIG. 4) and is not detected by the sensor 37.

The sensor 37 is a transmission-type sensor. Therefore, compared with a reflection-type sensor, it is possible to surely detect an object on which surface reflection less easily occurs.

An example of the operation of the post-processing apparatus 3 is explained.

As illustrated in FIG. 3, the sheet S sent from the paper discharging section 9 of the image forming apparatus 2 to the conveyance path 26 is sent to the standby tray 17 of the standby section 12.

As illustrated in FIGS. 4 and 5, the sheet S drops from the standby tray 17 with the own weight to be led into the processing tray 18. The sheet S dropped from the standby tray 17 passes the detection space 40 in a process for moving to the processing tray 18. In this case, since the sheet S blocks the detection light L, the intensity of the detection light L reaching the light receiving section 39 is smaller than the threshold.

Figure 8:
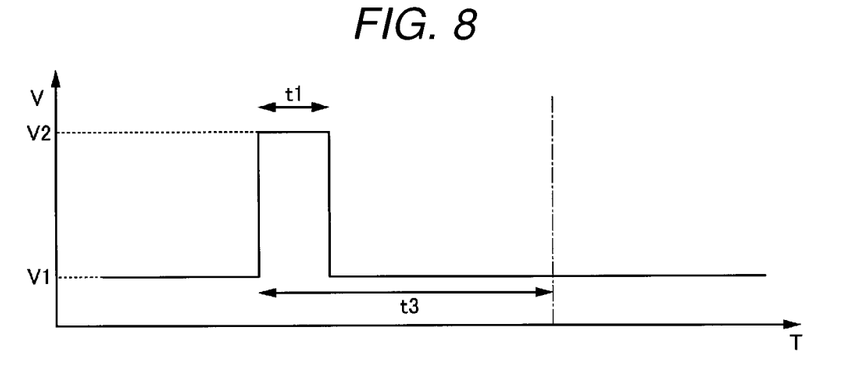
FIG. 8 is a diagram illustrating detection values of the sensor.
Figure 9:
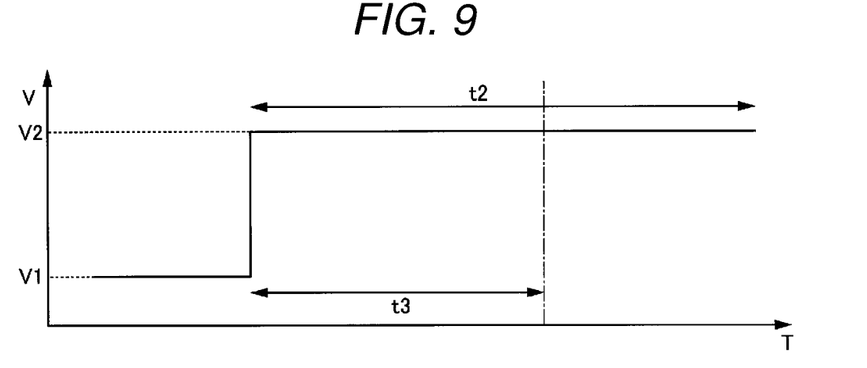
FIG. 9 is a diagram illustrating detection values of the sensor.

FIGS. 8 and 9 are diagrams illustrating detection values of the sensor 37. The horizontal axis indicates time (T) and the vertical axis indicates a detection value (V) of the sensor 37.

As illustrated in FIG. 8, if the sheet S passes the detection space 40, the intensity of the detection light L received by the light receiving section 39 is smaller than the threshold. Therefore, the detection value rises from a base value V1 to a detection value V2.

If the sheet S deviates from the detection space 40 (i.e., if the sheet S passes the detection space 40), the intensity of the detection light L received by the light receiving section 39 returns to a value equal to or larger than the threshold. The detection value decreases to the base value (V1). A time t1 in which the detection value is V2 is a time in which the sensor 37 detects the sheet S. The sheet S passes the detection space 40 in a short time by a freefall. Therefore, the time t1 in which the sensor 37 detects the sheet S is short.

As illustrated in FIG. 9, if an object different from the sheet S, for example, the finger of the user (in particular, the child) enters the detection space 40, the finger blocks the detection light L. Therefore, the detection value rises from the base value V1 to the detection value V2. Unlike the sheet S, the finger does not immediately deviate from the detection space 40. Therefore, a time t2 in which the sensor 37 detects the finger is long compared with the time t1 (see FIG. 8).

The post-processing control section 15 (see FIG. 1) controls the operation (work and stop) of the stapler 35 based on a time in which the sensor 37 detects the object. That is, as illustrated in FIG. 8, if the time t1 in which the sensor 37 detects the object is smaller than a preset setting value t3, the post-processing control section 15 causes the stapler 35 to continue the operation. As illustrated in FIG. 9, if the time t2 in which the sensor 37 detects the object is equal to or larger than the setting value t3, the post-processing control section 15 sends a stop signal to the stapler 35. The stapler 35 stops. Therefore, for example, if the finger of the user (in particular, the child) enters the detection space 40, it is possible to prevent an accident due to the stapler 35 and secure safety.

If the stapler 35 is stopped based on a result of the detection by the sensor 37, the stop of the stapler 35 due to the object detection by the sensor 37 may be displayed on, for example, a display of the control panel 5 (see FIG. 1).

The sheets S placed on the conveyance surface 18a of the processing tray 18 are held up until the sheets S are stacked to form the sheet bundle SS of the number of sheets to be stapled. If the sheets S on the processing tray 18 form the sheet bundle SS of the number of sheets to be stapled, the stapler 35 performs stapling on the sheet bundle SS. The ejector 36 discharges the sheet bundle SS for which the stapling is ended.

If the stapler 35 is stopped based on the detection result by the sensor 37 (see FIG. 9), the detection by the sensor 37 is stopped and the sheets Son the processing tray 18 are removed. Thereafter, the post-processing apparatus 3 is restarted.

In the post-processing apparatus 3, since safety can be improved, it is unnecessary to dispose the guide 34 excessively low. Therefore, the number of sheets S of the sheet bundle SS sent from the processing tray 18 to the stapler 35 can be increased. Therefore, it is possible to sufficiently secure the number of sheets S that can be stapled.

In the embodiment explained above, the sheet S drops from the standby tray 17 to be led into the processing tray 18. However, a path through which the sheet is led into the processing tray is not particularly limited. For example, the sheet may be led into the processing tray through a conveyance path for conveying the sheet in the plane direction with one or a plurality of pairs of roller. In that case, the sensor can detect the sheet conveyed through the conveyance path.

In the embodiment explained above, the image formation on the sheet S and the stapling are continuously performed using the image forming apparatus 2 and the post-processing apparatus 3. As a modification of the embodiment, the user may staple the sheet bundle SS with manual operation without using the image forming apparatus 2.

In the embodiment explained above, the post-processing apparatus 3 is separate from the image forming apparatus 2. However, the post-processing apparatus may be integrated with the image forming apparatus.

The sensor is not limited to the transmission-type sensor. Sensors of other types may be used. For example, a reflection-type sensor including a light emitting section and a light receiving section that receives reflected light can be used. The sensor may detect an arm of the user.

According to at least one embodiment explained above, the post-processing apparatus includes the sensor that detects an object passing the detection space and the post-processing control section (the control section) that controls the operation of the stapler (the post-processing section) based on a time in which the sensor detects the object. Therefore, for example, if the finger of the user (in particular, the child) enters the detection space, the stapler can be stopped. Therefore, it is possible to secure safety.

According to at least one embodiment, since safety can be improved, it is unnecessary to dispose the guide excessively low. Therefore, it is possible to increase the number of sheets of the sheet bundle sent from the processing tray to the stapler. Therefore, it is possible to sufficiently secure the number of post-processable sheets.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A post-processing apparatus, comprising:
a processing tray into which a sheet supplied from an image forming apparatus is led through a lead-in path;
a post-processing section configured to receive the sheet sent from the processing tray and apply post-processing to the sheet;
a sensor configured to detect an object passing a detection space within the lead-in path; and
a control section configured to control operation of the post-processing section based on a time in which the sensor detects the object, wherein the control section continues the operation of the post-processing section if the time in which the sensor detects the object is smaller than a setting value and stops the operation of the post-processing section if the time in which the sensor detects the object is equal to or larger than the setting value, wherein a distance of the sensor from a conveyance surface of the processing tray is larger than a thickness of a sheet bundle of a maximum number of sheets that can be stapled, and wherein the detection space is formed in a sheet width direction above the thickness of the sheet bundle of the maximum number of sheets that can be stapled, and
wherein the sensor comprises a transmission-type sensor including a light emitting section and a light receiving section that receives light emitted from the light emitting section, and wherein the light emitting section and the light receiving section are arranged to face each other at intervals in the sheet width direction.

2. The apparatus according to claim 1, wherein the lead-in path is a path through which the sheet is led into the processing tray by dropping from a standby tray using gravity.

3. The apparatus according to claim 1, wherein the post-processing section comprises a stapling section that staples the sheet.

4. The apparatus according to claim 1, wherein the processing tray receives the sheet from a standby tray of the post-processing apparatus, and the sensor is positioned between the processing tray and the standby tray.

5. The apparatus according to claim 1, wherein the processing tray receives sheets supplied from the image forming apparatus through the lead-in path and the post-processing section is configured to receive the sheets sent from the processing tray and apply post-processing to the sheets.

6. The apparatus according to claim 5, wherein the sheets form the sheet bundle on the processing tray.

7. The apparatus according to claim 1, wherein the post-processing section comprises at least one of a punching section, a folding section, and a bookbinding section.

8. A post-processing method, comprising:
supplying a sheet from an image forming apparatus through a lead-in path to a processing tray;
sending the sheet from the processing tray to a post-processing section and apply post-processing to the sheet;
detecting an object passing a detection space within the lead-in path; and
controlling operation of the post-processing section based on a time in which a sensor detects the object, continuing the operation of the post-processing section if the time in which detection of the object is smaller than a setting value and stopping the operation of the post-processing section if the time in which the detection of the object is equal to or larger than the setting value; and supplying the sheet from a standby tray of a post-processing apparatus, and the detection is executed between the processing tray and the standby tray, wherein a distance of the sensor from a conveyance surface of the processing tray is larger than a thickness of a sheet bundle of a maximum number of sheets that can be stapled, and wherein the detection space is formed in a sheet width direction above the thickness of the sheet bundle of the maximum number of sheets that can be stapled.

9. The method according to claim 8, further comprising: dropping the sheet from the standby tray to the processing tray using gravity.

10. The method according to claim 8, wherein the post-processing section comprises a stapling section that staples the sheet.

11. The method according to claim 8, wherein the detection involves using a sensor comprising a transmission-type sensor including a light emitting section and a light receiving section that receives light emitted from the light emitting section.

12. The method according to claim 8, further comprising: supplying sheets from the image forming apparatus through the lead-in path and sending the sheets from the processing tray and applying post-processing to the sheets.

13. The method according to claim 12, wherein the sheets form the sheet bundle on the processing tray.

14. The method according to claim 8, wherein the post-processing section comprises at least one of a punching section, a folding section, and a bookbinding section.

15. A post-processing apparatus, comprising:
a processing tray into which a sheet supplied from an image forming apparatus is led through a lead-in path;
a post-processing section configured to receive the sheet sent from the processing tray and apply post-processing to the sheet;
a sensor configured to detect an object passing a detection space within the lead-in path; and
a control section configured to control operation of the post-processing section based on a time in which the sensor detects the object, wherein the control section continues the operation of the post-processing section if the time in which the sensor detects the object is smaller than a setting value and stops the operation of the post-processing section if the time in which the sensor detects the object is equal to or larger than the setting value, wherein a distance of the sensor from a conveyance surface of the processing tray is larger than a thickness of a sheet bundle of a maximum number of sheets that can be stapled, and wherein the detection space is formed in a sheet width direction above the thickness of the sheet bundle of the maximum number of sheets that can be stapled, and
wherein the processing tray receives the sheet from a standby tray of the post-processing apparatus, and the sensor is positioned between the processing tray and the standby tray.

16. The apparatus according to claim 15, wherein the lead-in path is a path through which the sheet is led into the processing tray by dropping from the standby tray using gravity.

17. The apparatus according to claim 15, wherein the post-processing section comprises a stapling section that staples the sheet.

18. The apparatus according to claim 15, wherein the sensor comprises a transmission-type sensor including a light emitting section and a light receiving section that receives light emitted from the light emitting section, and wherein the light emitting section and the light receiving section are arranged to face each other at intervals in the sheet width direction.

19. The apparatus according to claim 15, wherein the processing tray receives sheets supplied from the image forming apparatus through the lead-in path and the post-processing section is configured to receive the sheets sent from the processing tray and apply the post-processing to the sheets.

20. The apparatus according to claim 15, wherein the post-processing section comprises at least one of a punching section, a folding section, and a bookbinding section.

* * * * *